US011823439B2

(12) United States Patent
Jansen et al.

(10) Patent No.: US 11,823,439 B2
(45) Date of Patent: Nov. 21, 2023

(54) TRAINING MACHINE-LEARNED MODELS FOR PERCEPTUAL TASKS USING BIOMETRIC DATA

(71) Applicant: Google LLC, Mountain View, CA (US)

(72) Inventors: Aren Jansen, Mountain View, CA (US); Malcolm Slaney, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 196 days.

(21) Appl. No.: 17/428,659

(22) PCT Filed: Jan. 16, 2020

(86) PCT No.: PCT/US2020/013772
§ 371 (c)(1),
(2) Date: Aug. 5, 2021

(87) PCT Pub. No.: WO2020/163053
PCT Pub. Date: Aug. 13, 2020

(65) Prior Publication Data
US 2022/0130134 A1 Apr. 28, 2022

Related U.S. Application Data

(60) Provisional application No. 62/801,831, filed on Feb. 6, 2019.

(51) Int. Cl.
*G06V 10/774* (2022.01)
*G06V 40/10* (2022.01)
*G06V 10/80* (2022.01)

(52) U.S. Cl.
CPC .......... *G06V 10/774* (2022.01); *G06V 10/811* (2022.01); *G06V 40/15* (2022.01)

(58) Field of Classification Search
CPC .... G06F 16/2465; G06F 16/355; G06F 21/32; G06B 40/00; H04N 21/441; G10L 17/24
See application file for complete search history.

(56) References Cited

U.S. PATENT DOCUMENTS 9,336,302 B1 * 5/2016 Swamy ............... G06F 16/2465
9,549,224 B2 * 1/2017 Jensen ................. H04N 21/812
(Continued)

OTHER PUBLICATIONS

Gaurav et al., "Re-Thinking EEG-Based Non-Invasive Brain Interfaces: Modeling and Analysis", 2018 ACM/IEEE 9th International Conference on Cyber-Physical Systems (ICCPS), IEEE, Apr. 11, 2018, pp. 275-286.
(Continued)

*Primary Examiner* — Yosef Kassa
(74) *Attorney, Agent, or Firm* — Dority & Manning, P.A.

(57) ABSTRACT

Generally, the present disclosure is directed to systems and methods that train machine-learned models (e.g., artificial neural networks) to perform perceptual or cognitive task(s) based on biometric data (e.g., brain wave recordings) collected from living organism(s) while the living organism(s) are performing the perceptual or cognitive task(s). In particular, aspects of the present disclosure are directed to a new supervision paradigm, by which machine-learned feature extraction models are trained using example stimuli paired with companion biometric data such as neural activity recordings (e g electroencephalogram data, electrocorticography data, functional near-infrared spectroscopy, and/or magnetoencephalography data) collected from a living organism (e.g., human being) while the organism perceived those examples (e.g., viewing the image, listening to the speech, etc.).

19 Claims, 11 Drawing Sheets

(56) References Cited

U.S. PATENT DOCUMENTS

| | | | |
|---|---|---|---|
| 9,741,337 B1* | 8/2017 | Shastry | G10L 17/04 |
| 9,955,218 B2* | 4/2018 | Panchaksharaiah | H04N 21/44218 |
| 10,515,627 B2* | 12/2019 | Li | G10L 15/02 |
| 10,540,980 B2* | 1/2020 | Zheng | H04L 63/0861 |
| 10,650,379 B2* | 5/2020 | Agrawal | G10L 17/24 |
| 11,080,655 B2* | 8/2021 | Cleaver | G06N 20/00 |

OTHER PUBLICATIONS

International Search Report for Application No. PCT/US2002/013772, dated May 12, 2020, 1 page.

Raposo et al., "Towards Deep Modeling of Music Semantics Using EEG Regularizers", arxiv.org, www.arxiv.org/abs/1712.05197, Dec. 15, 2017, 5 pages.

Yu et al., "A Novel Brain Decoding Method: A Correlation Network Framework for Revealing Brain Connections", arxiv.org, Dec. 1, 2017, XP080844846.

International Preliminary Report on Patentability for Application No. PCT/US2020/013772, dated Aug. 10, 2021, 7 pages.

\* cited by examiner

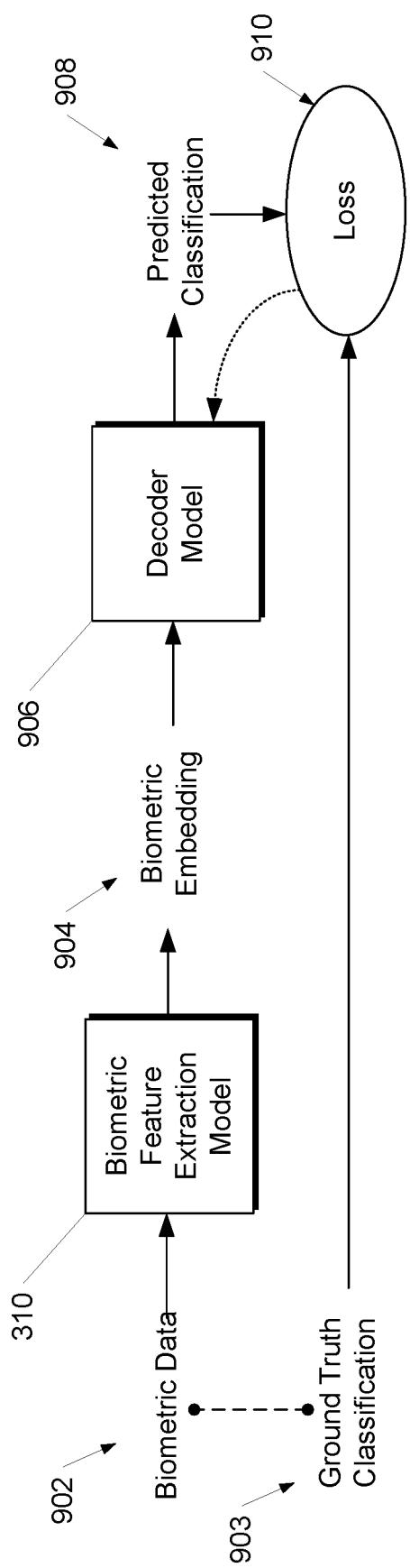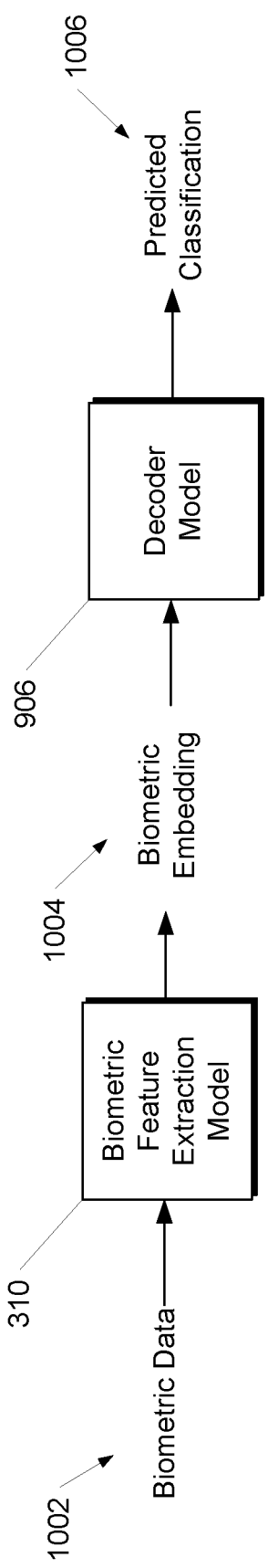
Figure 8
Figure 9

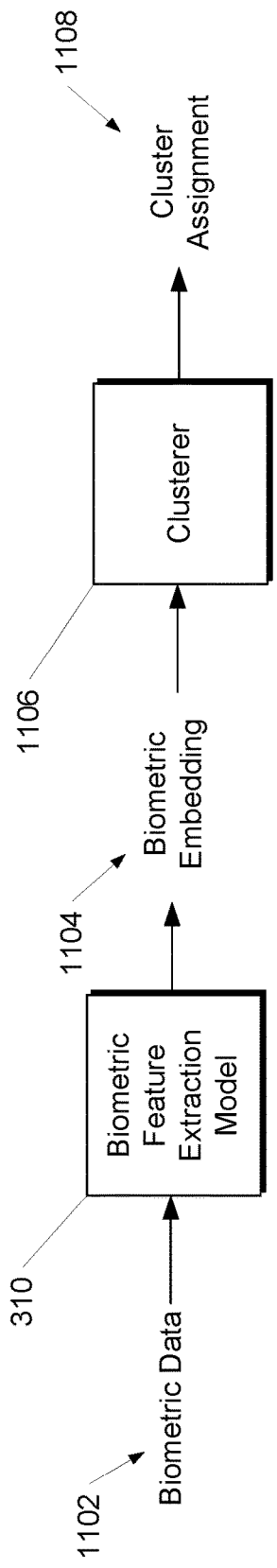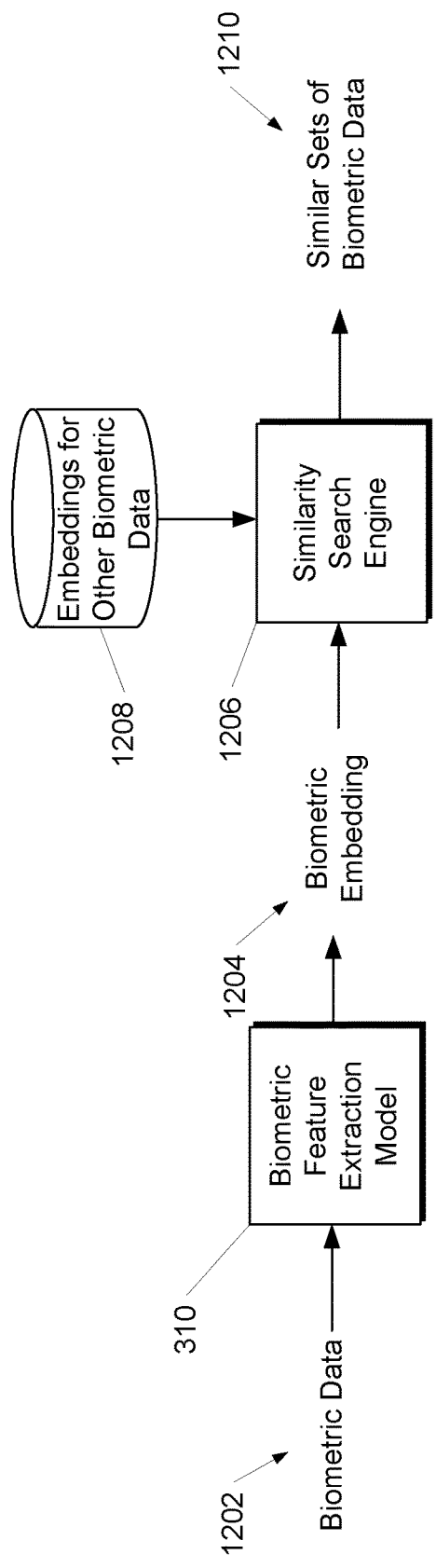

TRAINING MACHINE-LEARNED MODELS FOR PERCEPTUAL TASKS USING BIOMETRIC DATA

RELATED APPLICATIONS

The present disclosure is based upon and claims the right of priority under 35 U.S.C. § 371 to International Application No. PCT/US2020/013772 filed on Jan. 16, 2020, which claims priority to and the benefit of U.S. Provisional Patent App. No. 62/801,831 file Feb. 6, 2019. Applicant claims priority to and the benefit of each of such applications and incorporate all such applications herein by reference in its entirety.

FIELD

The present disclosure relates generally to machine learning. More particularly, the present disclosure relates to the use of biometric data such as, for example, neural activity recordings (e.g., brain wave recordings) to train machine-learned models to perform perceptual tasks, for example, via multi-modal learning techniques.

BACKGROUND

Humans excel at a wide variety of perceptual and cognitive tasks, including visual object recognition, acoustic event recognition, and speech recognition, among many others. One typical way to train machine-learned models to perform these tasks is to train the models on training data that includes training examples that have been explicitly labeled by human labelers. For example, to generate such training data, a computing system can present humans with realistic training examples (e.g., pictures of objects, spoken sentences) and solicit explicit categorical labels that are the result of the humans applying their internal perceptual and cognitive capabilities. The internal human perceptual activities performed by the human when perceiving the training example encode a lifetime of experience and expertise and allow the human to effortlessly perform the annotation. A researcher or engineer then uses those paired examples and labels to train a model to mimic the human perceptive capabilities.

As an example, a human may be presented with a picture of a cat and asked to identify (e.g., classify) the animal in the picture. The human can apply her internal perceptual capabilities to identify the cat and can respond (e.g., through manual entry of data into a computing device) with an explicit label of cat. For example, the user can manually type in the label or can select the "cat" label from a displayed set of available choices. The explicit label can then be associated with (e.g., annotated to) the image (e.g., in a database) for inclusion in the training dataset.

However, the labeling procedure described above is both time consuming and costly. In particular, manual entry of labels by human labelers can require undesirable amounts of time and other resources. Thus, it is challenging to obtain training data that can be used to produce machine-learned models that can perform specific perceptual tasks.

As a result, unsupervised learning procedures have been developed over the past several years for many application domains, which allow training large portions of these networks using unlabeled data only. While these unsupervised methods can reduce the amount of labeled data required to build a new model, the performance of the resulting models consistently falls short of what becomes possible with only a moderate amount of humanly annotated training examples.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to perform multi-modal learning. The method includes accessing, by one or more computing devices, data descriptive of a plurality of training examples, wherein each training example comprises a respective stimulus and a respective set of biometric data collected from a living organism concurrent with exposure of the living organism to the respective stimulus, the living organism having been instructed to perform a perceptual task on the respective stimulus during exposure of the living organism to the respective stimulus. The method includes, for each of one or more of the plurality of training examples: inputting, by the one or more computing devices, the respective stimulus into a machine-learned stimulus feature extraction model configured to process the respective stimulus to produce a respective stimulus embedding. The method includes, for each of one or more of the plurality of training examples: receiving, by the one or more computing devices, the respective stimulus embedding as an output of the machine-learned stimulus feature extraction model. The method includes, for each of one or more of the plurality of training examples: inputting, by the one or more computing devices, the respective set of biometric data into a machine-learned biometric feature extraction model configured to process the respective set of biometric data to produce a respective biometric embedding. The method includes, for each of one or more of the plurality of training examples: receiving, by the one or more computing devices, the respective biometric embedding as an output of the machine-learned biometric feature extraction model. The method includes, for each of one or more of the plurality of training examples: learning, by the one or more computing devices and based at least in part on the respective stimulus embedding and the respective biometric embedding, one or both of: first parameter values of the machine-learned stimulus feature extraction model and second parameter values of the machine-learned biometric feature extraction model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 8 depicts a block diagram of an example scheme to train a classification or detection model according to example embodiments of the present disclosure.

FIG. 9 depicts a block diagram of an example scheme to employ a classification or detection model according to example embodiments of the present disclosure.

FIG. 10 depicts a block diagram of an example scheme to generate clusters according to example embodiments of the present disclosure.

FIG. 11 depicts a block diagram of an example scheme to perform similarity search according to example embodiments of the present disclosure.

Figure 1:
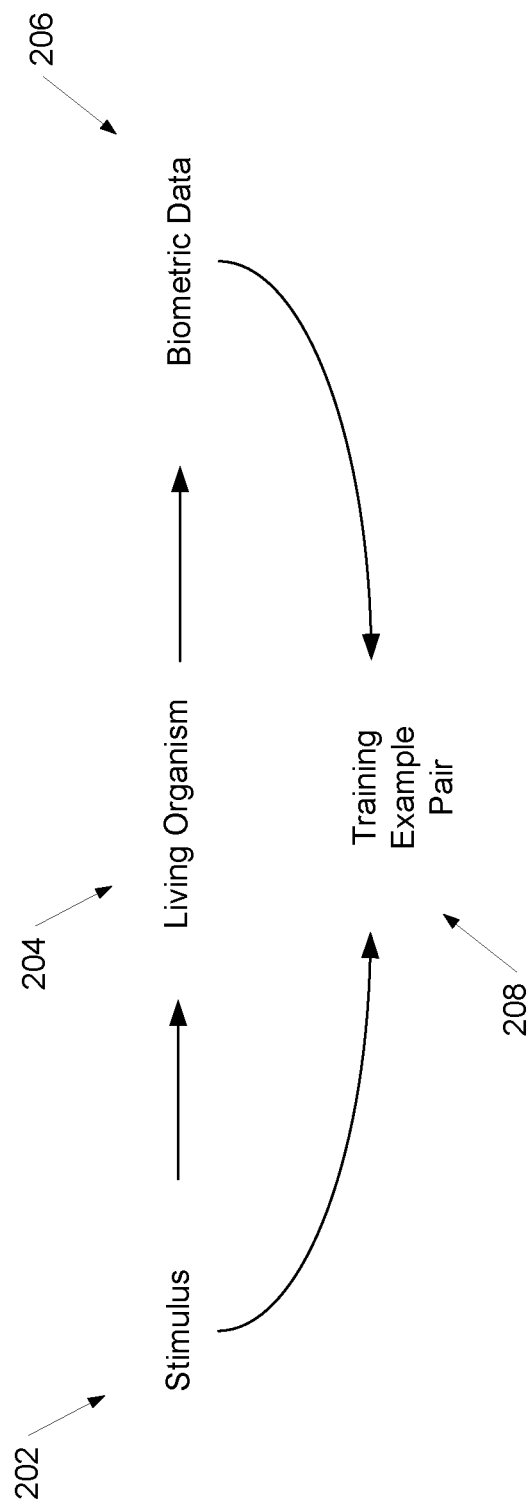
FIG. 1 depicts a block diagram of an example scheme to generate training example pairs according to example embodiments of the present disclosure.

Reference numerals that are repeated across plural figures are intended to identify the same features in various implementations.

DETAILED DESCRIPTION

Overview

Generally, the present disclosure is directed to systems and methods that train machine-learned models (e.g., artificial neural networks) to perform perceptual or cognitive task(s) based on biometric data (e.g., brain wave recordings) collected from living organism(s) while the living organism (s) are performing the perceptual or cognitive task(s). In particular, aspects of the present disclosure are directed to a new supervision paradigm, by which machine-learned feature extraction models are trained using example stimuli paired with companion biometric data such as neural activity recordings (e.g. electroencephalogram data, electrocorticography data, and/or magnetoencephalography data) collected from a living organism (e.g., human being who has agreed to participate in a data collection effort) while the organism perceived those examples (e.g., viewing the image, listening to the speech, etc.). In such fashion, implicit, but learnable, labels encoded within the biometric data can be obtained simply through collection of biometric data contemporaneous with exposure of the labeling organism to the stimuli, which is a significantly faster process than explicit manual labeling of examples (e.g., via manual data entry into a computer).

Aspects of the present disclosure leverage the following principle: biometric data such as brain recordings that include signals from neurons (e.g., neurons in a suitably late stage in the brain's processing path) will encode (e.g., in a potentially complex, but learnable way) the categorical assignments that the implicit human annotation provides. Thus, living organisms such as humans can be asked and volunteer to participate in a biometric data collection process that enables machine learning based on the collected data. As such, data is not collected from living organisms without the living organisms consenting to such collection.

Furthermore, according to an aspect of the present disclosure, the living organism can have been instructed to perform during perception of the stimulus the specific perceptual task for which it is desired to train the machine-learned model (e.g., classification of the stimulus, detection of objects within the stimulus, etc.). In such fashion, the collected biometric data (e.g., neural activity recordings) can be specific to and encode information specifically useful for performing the particular perceptual task at issue.

According to another aspect, the systems and methods of the present disclosure can employ a multi-modal machine learning architecture that uses the collected biometric data to supervise training of a machine-learned feature extraction model to extract features from the stimulus (e.g., which can be output in the form of an embedding). Such a learning procedure allows transfer of the living organism's cognitive or perceptual processing capabilities (e.g., as encoded within perceptual processing structures such as biological neural networks) directly into their artificial machine-learned equivalent for use in automatic systems, without needing any effort from the organism other than their mental attention when perceiving the stimulus. This is a specific technical purpose which leads to a much more passive annotation procedure and greatly speeds up data collection. The trained machine-learned feature extraction model can then be employed to perform (or serve as a seed for further training of a system to perform) the desired perceptual task.

Thus, example implementations of the present disclosure apply a multi-modal unsupervised learning strategy to pairs of stimulus and biometric data such as brain recording data. For example, the multi-modal learning strategy can enable joint learning of two feature extraction models, one for each modality, from paired examples of the two data types. In certain multi-modal learning architectures, the ability to predict coincidence of the paired inputs drives the representation learning.

To provide an example, assume a human is presented with a large number of still photographs and the human is instructed to think about the object categories present in the stimulus. Brain recordings descriptive of neural activity of the human while the human is presented with the photographs can be collected. The systems and methods of the present disclosure can jointly train a model for each modality (e.g., photograph and brain recordings) that allows predicting whether or not a brain recording and stimulus were paired or not (or otherwise providing an embedding that can be used to make such a prediction or measure of correlation). The stimulus model that permits this judgement will encode the aspects of the brain recordings that were specialized to that stimulus and not present in the other. This imposes weak semantic supervision of the stimulus model, without having to ever realize explicit human annotations.

In such fashion, to obtain labels for stimuli that are specific to a particular perceptual task, one simply needs to present the type of stimulus to be processed and collect biometric data such as brain recordings from the organism performing the particular perceptual task, thereby enabling learning of a representation that is specialized for that task, which is in contrast to learning of a generic and unspecific representation of the stimuli. Thus, example aspects of the present disclosure capitalize on easily collected biometric data to provide general information on a wide range of perceptual signals, quickly and at scale. In particular, through the proposed passive labeling process, labeling time can be significantly reduced, thereby reducing the amount of computing resources (e.g., processor time, energy consumption, etc.) that are required to be expended during the labeling process.

The types of problems that could be solved in this way would are limited only by what information is encoded in the biometric data (e.g., neural signals) that is collected. Visual and acoustic objects, as well as speech are clearly resolvable using these techniques. However, higher-level cognitive judgements are also encoded in the brain recordings, especially if the participants are asked to focus on those aspects.

Furthermore, aspects of the present disclosure may enable learning of personalized feature extraction models. In particular, application of the proposed techniques to data collected from a single human subject can enable automatic learning of what is important to that specific human subject, as the learned embedding signal will be personal and related to that specific human's interests and distinctions. To provide a specific example, consider a person who is a cat fancier. That subject's brain will produce different neural signals for each different type of cat, while somebody who does not have interest in cats will likely consistently respond with a generic cat response. Thus, training on data collected from the cat fancier may enable learning of a feature extraction model that is able to extract features from images of cats that are usable to distinguish between different types of cats and, further, will make distinctions closely upon the same concepts of perception that are important to the cat fancier. In such fashion, models that process stimuli to generate predictions that are specific to and mimic the judgement of a specific organism (e.g., human) can be generated by limiting the training data to data collected from that specific organism.

Various embodiments disclosed herein are directed to specific technical implementations motivated by technical considerations of the internal functioning of the computing apparatus on which they are run. For example, after training of the machine-learned stimulus feature extraction model by the methods disclosed herein, stimuli can be represented by specialized embeddings in a space of significantly lower dimension to that of the original representations of the stimuli initially processed by the machine-learned feature extraction model. Representing a stimulus by an embedding in this way requires far fewer bits of memory when compared to the original representation, thereby reducing hardware resources required to process the stimulus. Moreover, in contrast to generic or unspecific embeddings, specialized embeddings can encapsulate more semantic information about the stimuli. Consequently, the embedding space can be learned in such a way that the specialized embeddings generated for similar stimuli are tightly clustered together, and more similar clusters are closer in distance to each other than unrelated clusters. Thus, only a few (e.g. 1-5) labelled stimuli per cluster may be required in order to train a classifier to accurately predict labels for unlabeled stimuli. This vastly reduces the amount of labelled data required in order to make accurate predictions, when compared to other methods used for supervised learning, thereby permitting training without the need for high performance hardware environments.

With reference now to the Figures, example embodiments of the present disclosure will be discussed in further detail.

Example Training Data Generation

FIG. 1 depicts a block diagram of an example scheme to generate training example pairs 208 according to example embodiments of the present disclosure. As illustrated in FIG. 1, a stimulus 202 can be presented to a living organism 204. Biometric data 206 can be collected from the living organism 204 contemporaneous with presentation of the stimulus 202 to the living organism. The collected biometric data 206 can be associated with the stimulus 202 (e.g., in a database or other logical structure) to form a training example pair 208. In such fashion, a large number of training example pairs 208 can be generated.

The stimulus 202 can be any form of stimulus that can be perceived by the living organism 204. As an example, the stimulus 202 can be a visual stimulus such as, for example, an image, a video (e.g., with related and/or unrelated imagery), a shape, a color, one or more wavelengths of lights, etc. As another example, the stimulus 202 can be an auditory stimulus such as, for example, music, speech (e.g., in one or more different human languages), noise, one or more tones, one or more timbres, one or more wavelengths of audio, etc. As another example, the stimulus 202 can be a haptic stimulus such as, for example, a touch strength, a touch pattern, an object with surface characteristics (e.g., sandpaper, wool, wood, etc.), a movement of air, a vibration, a pressure, etc. As yet another example, the stimulus 202 can be an olfactory stimulus, such as, for example, a certain perfume, a certain chemical structure (e.g., isoamyl acetate), an object that has an odor (e.g., a banana, gasoline, mothballs, etc.), etc. As another example, the stimulus 202 can be a gustatory stimulus such as, for example, a certain flavoring substance, a certain chemical structure (e.g., ethyl methylphenylglycidate), an object that has a flavor (e.g., a banana, chocolate, etc.), etc.

According to an aspect of the present disclosure, the living organism 204 can have been instructed to perform during perception of the stimulus 202 a specific perceptual task. In such fashion, the collected biometric data 206 can be specific to and encode information specifically useful for performing the particular perceptual task.

The living organism 204 can include any different types of organism. In one example, the living organism 204 can be one or more humans. As other examples, the living organism 204 can be one or more mammals (e.g., dolphins, primates, canines, felines, etc.). Use of only a single organism 204 to generate the training example pairs 208 can enable learning of personalized models, while use of multiple different organisms 204 (e.g., of the same species) to generate the training example pairs 208 can enable learning of more generalized and/or normalized models (e.g., applicable to the whole species).

The perceptual task can be any different task that the living organism 204 performs while perceiving the stimulus 202. As one example, the perceptual task can include classifying the stimulus 202 into one or more classes. For example, the stimulus 202 can be an image and the perceptual task can include classifying the image into one or more classes based on the scene depicted by the image (e.g., an image depicting a beach can be classified into the following classes: "beach", "sand", "ocean", etc.). The classification can include classification of physical objects (e.g., "cat", "dog", etc.) or can be classification of events (e.g., "jumping", "dancing", etc.). As another example, the stimulus 202 can be audio of human speech and the plurality of classes can be classes associated with a plurality of phonemes, a plurality of words, a plurality of semantic concepts (e.g., "news", "conversation", "sports", etc.), or a plurality of emotions (e.g., "angry", "sad", "excited", etc.). Thus, the perceptual task can include recognition of sounds that belong to the classes within the human speech. As yet another example, the stimulus 202 can be an olfactory or gustatory stimulus and the plurality of classes can be classes that describe olfactory or gustatory properties of the stimulus (e.g., tastes or smells like "pear", "pine", etc.).

As another example, the perceptual task can include detection of one or more items contained within the respective stimulus. The items can be physical items (e.g., "cat", "dog", etc.) or events (e.g., "jumping", "dancing", etc.). In some instances, detection of the one or more items can include perceiving a particular location within the stimulus at which the item is contained (e.g., perceiving a particular set of pixels, a bounding box, or other representation of location(s) within an image at which a particular item (e.g., a cat) is depicted). Similarly, in some implementations, the perceptual task can include perceiving one or more portions of the stimulus 202 that warrant heightened "attention" relative to the other portions of the stimulus 202. For example, portions of the stimulus that warrant heightened attention may be most important for perceiving the stimulus 202, may be changing in some way relative to other static portions of the scene, may be portions that include an object or event of interest, etc.

The biometric data 206 can be any different type of biometric data collected from the living organism 204. As one example, the biometric data 206 can include neural recording data that describes neural activity of the living organism 204 concurrent with exposure of the living organism 204 to the stimulus 202. For example, the neural recording data can include one or more of: electroencephalogram data; electrocorticography data; magnetoencephalography data; and functional near-infrared spectroscopy. As other examples, the biometric data 206 can include temperature data (e.g., measured at various locations on a surface of the living organism); color data (e.g., a measure of blushing); eye movement data; iris or retinal data; pulse rate data; voice data; facial movement data; respiratory data; pore data; follicular data; cellular data; etc. The biometric data 206 can be raw biometric data or can be measure relative to a baseline established for the living organism 204. Importantly, biometric data is not collected from the living organism 204 unless the living organism 204 has consented to collection of such data (e.g., consent to participate in the data collection program).

The biometric data 206 can be collected concurrent with exposure of the living organism 204 to the stimulus 202. In some implementations, the period of data collection can be identical to a period of exposure. In some implementations, the period of data collection can be offset from the period of exposure by a delay amount (e.g., a delay amount that is based on information regarding how long it takes the living organism 204 to perceive the stimulus 202).

After collection of the biometric data 206, the stimulus 202 and the biometric data 206 can be associated with each other as a training example pair 208. For example, the stimulus 202 and the biometric data 206 can be associated with each other in a database or other data structure. In such fashion, a large number of training example pairs 208 can quickly and easily be generated, without the need for time-consuming manual data entry and associated expenditure of computing resources.

Example Multi-Modal Learning Schemes

Figure 2:
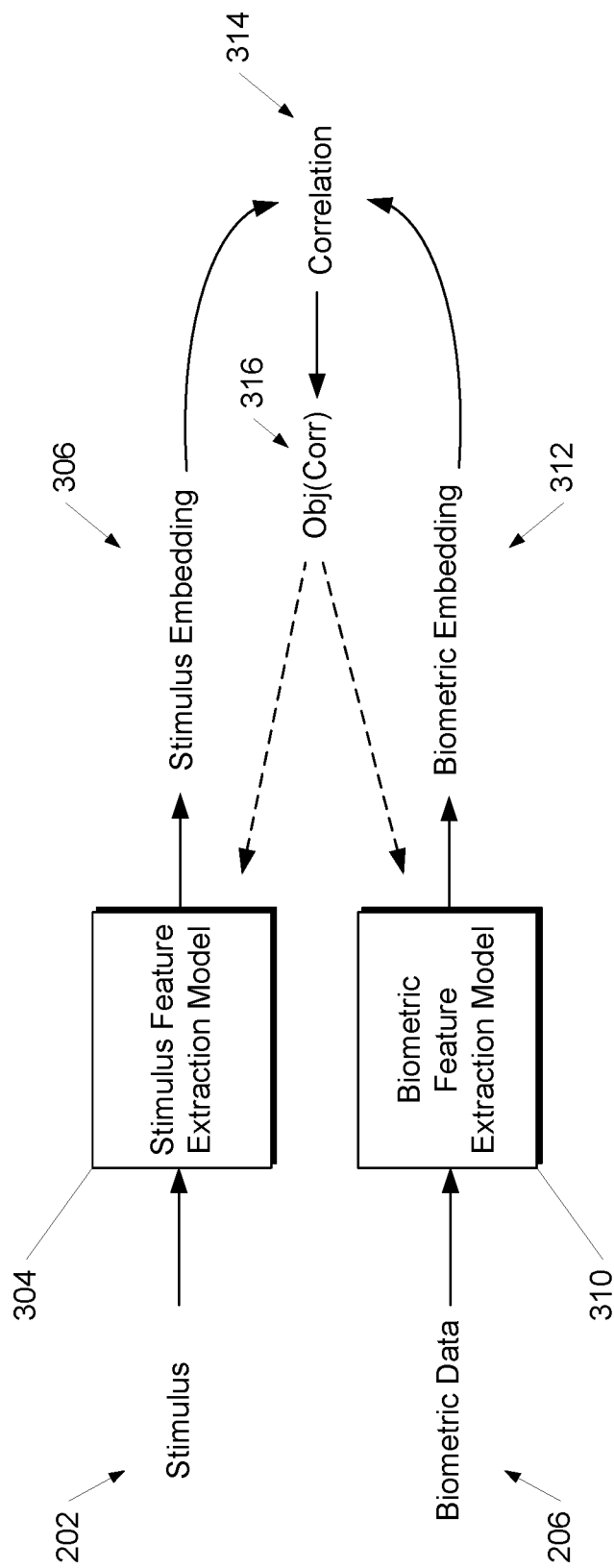
FIG. 2 depicts a block diagram of an example scheme to perform multi-modal learning according to example embodiments of the present disclosure.

FIG. 2 depicts a block diagram of an example scheme to perform multi-modal learning according to example embodiments of the present disclosure. The scheme illustrated in FIG. 2 includes a stimulus feature extraction model 304 and a biometric feature extraction model 310. Each of the models 304 and 310 can be any form of machine-learned models, including, for example, artificial neural networks.

A stimulus 202 can be input into the stimulus feature extraction model 304. In response, the stimulus feature extraction model 304 can process the stimulus 202 to produce a stimulus embedding 306. The stimulus embedding 306 can be descriptive of features extracted from the stimulus 202. In some implementations, the stimulus embedding 306 can be a numerical feature vector providing numerical feature values in an embedding dimensional space. For example, the embedding dimensional space may be a learned space that is non-interpretable to human observers.

A set of biometric data 206 can be input into the biometric feature extraction model 310. In response, the biometric feature extraction model 310 can process the set of biometric data 206 to produce a biometric embedding 312. The biometric embedding 312 can be descriptive of features extracted from the set of biometric data 206. In some implementations, the biometric embedding 312 can be a numerical feature vector providing numerical feature values in an embedding dimensional space. For example, the embedding dimensional space may be a learned space that is non-interpretable to human observers.

In some instances, the stimulus 202 and the set of biometric data 206 can be associated with each other as a pair of training data collected, for example, as illustrated in FIG. 1. More particularly, referring still to FIG. 2, a correlation 314 can be determined between the stimulus embedding 306 and the biometric embedding 312. An objective function 316 can be evaluated based on the correlation 314. For example, the objective function 316 can seek to maximize the correlation 314. As one example, the objective function 316 can have the following form:

$$(\theta_1^*, \theta_2^*) = \operatorname{argmax}_{(\theta_1, \theta_2)} \operatorname{corr}(f_1(X_1; \theta_1), f_2(X_2; \theta_2)).$$

where $f_1(X_1; \theta_1)$ is the stimulus embedding 306 output by the stimulus feature extraction model $f_1(\cdot)$ with parameter values $\theta_1$ and given the stimulus 202 as input $X_1$ and where $f_2(X_2; \theta_2)$ is the biometric embedding 312 output by the biometric feature extraction model $f_2(\cdot)$ with parameter values $\theta_2$ and given the biometric data 206 as input $X_2$.

The optimal parameter values $(\theta_1^*, \theta_2^*)$ can be learned over time by optimizing the object function 316. As one example, the objective function 316 can be backpropagated (e.g., jointly) through the stimulus feature extraction model 304 and the biometric feature extraction model 310. For example, a number of iterations can be performed over a number of pairs of inputs, which may include pairs of inputs that are associated with each other. In some implementations, additional constraints may be provided on the objective function 316. For example, the embeddings can be constrained to be uncorrelated with previous embeddings from different training pairs. Thus, over a number of training pairs, the models 304 and 310 can learn to produce embeddings 306 and 312 that have high correlation when the corresponding inputs are associated with each other. In such fashion, weak semantic supervision can be imposed, thereby enabling learning of respective parameter values for each model 304 and 310 that encode information from the other data modality, without having to ever realize explicit human annotations.

In some implementations, the scheme illustrated in FIG. 2 (or similar) can be used to perform a technique known as Deep Canonical Correlation Analysis (or similar). See Andrew et al., Deep Canonical Correlation Analysis, *Proceedings of the* 30*th International Conference on Machine Learning*, Atlanta, Georgia, USA, 2013. JMLR: W&CP volume 28.

Figure 3:
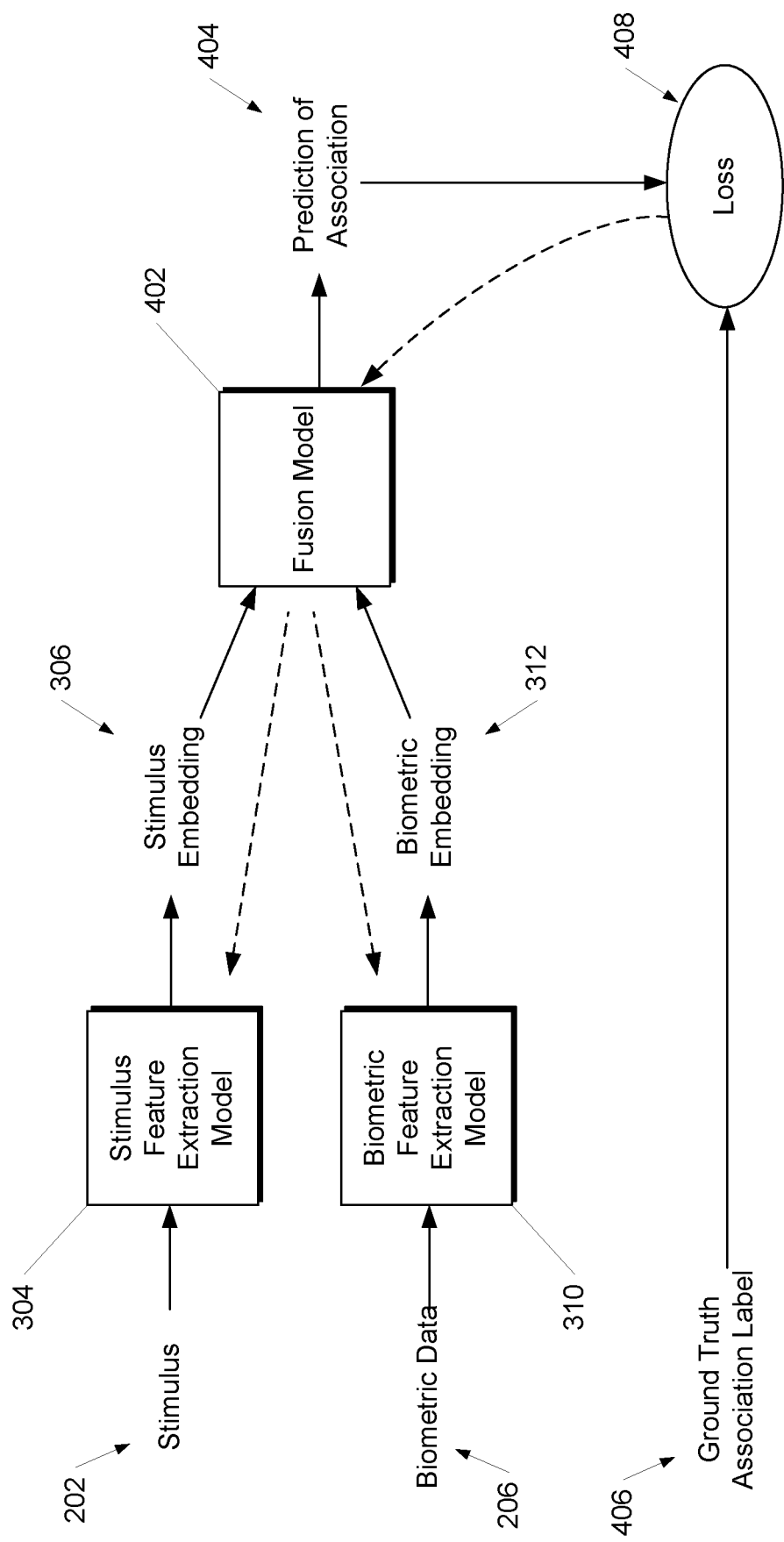
FIG. 3 depicts a block diagram of an example scheme to perform multi-modal learning according to example embodiments of the present disclosure.

FIG. 3 depicts a block diagram of another example scheme to perform multi-modal learning according to example embodiments of the present disclosure. The scheme in FIG. 3 is similar to the scheme in FIG. 2, where a stimulus 202 is input into a stimulus feature extraction model 304 to obtain a stimulus embedding 306 and a set of biometric data 206 is input into a biometric feature extraction model 310 to obtain a biometric embedding 312.

Referring to FIG. 3, in some instances, the stimulus 202 and the set of biometric data 206 can be associated with each other as a pair of training data collected, for example, as illustrated in FIG. 1. However, still referring to FIG. 3, in other instances, the stimulus 202 and the set of biometric data 206 are not associated with each other and do not form a pair of training data, but instead may be selected, for example, from two different and unassociated pairs of training data. Stated differently, both actual matching pairs and non-matching pairs of stimuli/biometric data can be input into the scheme illustrated in FIG. 3 to assist in training the illustrated models to generate features that encode the ability to distinguish between associated and unassociated pairs of inputs. For each pair of inputs, there can exist a ground truth association label 406 that indicates whether the pair of inputs are associated with each other or are not associated with each other.

More particularly, the scheme illustrated in FIG. 3 further includes a fusion model 402. The fusion model 402 can obtain the embeddings 306 and 312 and process the embeddings to generate a prediction of association 404. The prediction 404 can be a prediction about whether the pair of inputs 202 and 206 are associated with each other or are not associated with each other. Thus, the fusion model 402 can try to predict the ground truth association label 406.

A loss function 408 can evaluate a difference between the prediction of association 404 and the ground truth association label 406. Thus, the ensemble of models 304, 310, and 402 can be evaluated on its ability to correctly predict whether a given pair of inputs is associated with each other or not. The optimal values of the models 304, 310, and 402 can be learned to optimize the loss function 408 over a number of training iterations. For example, the loss function 408 can be backpropagated through the fusion model 402 and then further jointly through the stimulus feature extraction model 304 and the biometric feature extraction model 310. In such fashion, weak semantic supervision can be imposed, thereby enabling learning of respective parameter values for each model 304 and 310 that encode information from the other data modality, without having to ever realize explicit human annotations.

In some implementations, the scheme illustrated in FIG. 3 (or similar) can be used to perform a technique known as Look, Listen, and Learn (or similar). See Arandjelovic and Zisserman, Look, Listen and Learn, *IEEE International Conference on Computer Vision* (ICCV) 2017.

FIGS. 2-3 illustrate example multi-modal learning schemes that can be used to train machine-learned feature extraction models. These schemes are provided as examples only. Other and different multi-modal learning schemes can be performed as well. For example, in some implementations, a multi-modal variational encoder-decoder scheme can be used. In some implementations, after performing multi-modal learning, the resulting models (e.g., the stimulus feature extraction model 304 and the biometric feature extraction model 310) can be employed to perform additional tasks such as perceptive tasks described herein.

Example Model Uses

FIGS. 4-11 describe example uses of machine-learned feature extraction models. These uses are provided as examples only. Other and different applications and uses of the machine-learned feature extraction models can be performed as well. In some implementations, the machine-learned feature extraction models will have been trained first according to a multi-modal learning scheme (e.g., the scheme illustrated in FIG. 2 or FIG. 3) and then, after such multi-modal learning, will be applied to the example uses described in FIGS. 4-11. Thus, the parameters of the feature extraction models can first be learned based on the multi-modal data and can then be refined and/or used to perform tasks on other data, which may be the same as, similar to, or different to the data described with reference to FIGS. 1-3.

Figure 4:
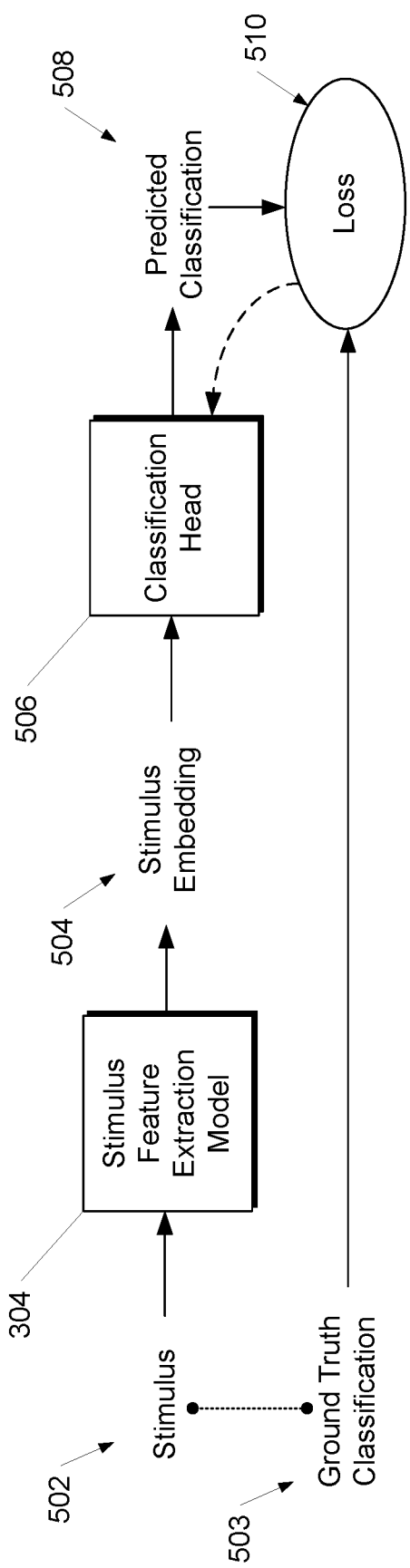
FIG. 4 depicts a block diagram of an example scheme to train a classification or detection model according to example embodiments of the present disclosure.

FIG. 4 depicts a block diagram of an example scheme to train a classification or detection model according to example embodiments of the present disclosure. In particular, FIG. 4 illustrates the addition of a classification or detection head 506 subsequent to a stimulus feature extraction model 304. The classification or detection head 506 can be any type of machine-learned model including, for example, an artificial neural network, a linear model, a regression model, etc. The classification or detection head 506 can include one or more layers.

The stimulus feature extraction model 304 can output a stimulus embedding 504 based on a stimulus 502. A ground truth label 503 can be associated with the stimulus 502. In some implementations, the ground truth label 503 can be a manually applied label.

The classification or detection head 506 can be trained to make a predicted classification or detection 508 based on the stimulus embedding 504 output by the stimulus feature extraction model 304. The predicted classification or detection 508 can be any type of classification or detection, such as classifications or detections resultant from any of the perceptual tasks described with reference to FIG. 1, including attention outputs.

A loss function 510 can compare (e.g., determine a difference between) the predicted classification or detection 508 and the ground truth label 503. The classification or detection head 506 can be learned based on the loss function 510. For example, for each of a number of different training examples, the loss function 510 can be backpropagated through the classification or detection head 506 to modify the values of the parameters of the classification or detection head 506.

In some implementations, during learning of the classification or detection head 506, the parameters of the stimulus feature extraction model 304 can be held fixed. In other implementations, the stimulus feature extraction model 304 can be jointly learned (e.g., refined) with the classification or detection head 506. For example, the loss function 510 can continue to be backpropagated through the stimulus feature extraction model 304 after backpropagation through the classification or detection head 506.

In some implementations, the stimulus 502 and predicted classification and detection 508 can be of the same data type and perceptual task as the data upon which the stimulus feature extraction model 304 was previously trained (e.g., as illustrated in FIG. 2 or 3). Thus, in one example, the classification or detection model that results from the training in FIG. 4 can perform the same perceptual task that was performed by the living organism. In other implementations, the stimulus 502 and predicted classification and detection 508 can be of a different data type and/or perceptual task as the data upon which the stimulus feature extraction model 304 was previously trained (e.g., as illustrated in FIG. 2 or 3). Thus, in one example, the classification or detection model that results from the training in FIG. 4 can perform a different perceptual task than was performed by the living organism. For example, the different perceptual task may be a related perceptual task. As one example, multi-model training can be performed to learn a feature extraction model based on biometric data that encodes detection of dogs. Additional supervised learning on a small manually labeled dataset can be performed as shown in FIG. 4 to further learn a model capable of detecting a certain breed of dog. Thus, transfer learning can be performed using the model resultant from a multi-modal learning scheme as a starting point.

Figure 5:
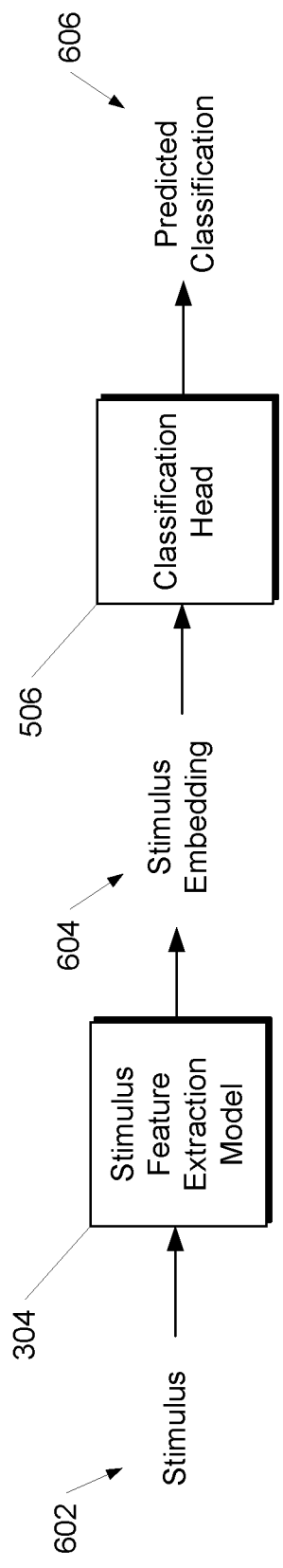
FIG. 5 depicts a block diagram of an example scheme to employ a classification or detection model according to example embodiments of the present disclosure.

FIG. 5 depicts a block diagram of an example scheme to employ the classification or detection model following the learning shown in FIG. 4. In particular, as shown in FIG. 5, a new stimulus 602 can be provided to the stimulus feature extraction model 304, which can, in response, produce a stimulus embedding 604. The classification or detection head 506 can receive the stimulus embedding 604 and generate a predicted classification or detection 606.

Figure 6:
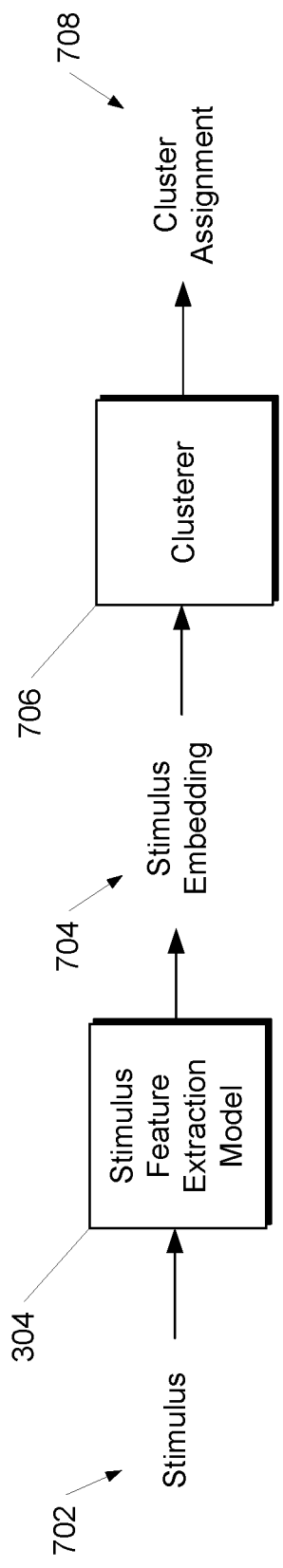
FIG. 6 depicts a block diagram of an example scheme to generate clusters according to example embodiments of the present disclosure.

FIG. 6 depicts a block diagram of an example scheme to generate clusters according to example embodiments of the present disclosure. In particular, as shown in FIG. 6, a new stimulus 702 can be provided to the stimulus feature extraction model 304, which can, in response, produce a stimulus embedding 704. A clusterer 706 can obtain the stimulus embedding 704 and provide a cluster assignment 708 for the stimulus 702. In some implementations, a classification for the stimulus 702 can be generated based on the cluster assignment 708. For example, after clustering a large number of stimuli into a plurality of clusters, a human can review one or more representative stimuli for each cluster and provide a respective classification for each cluster that can be applied to all cluster members.

Figure 7:
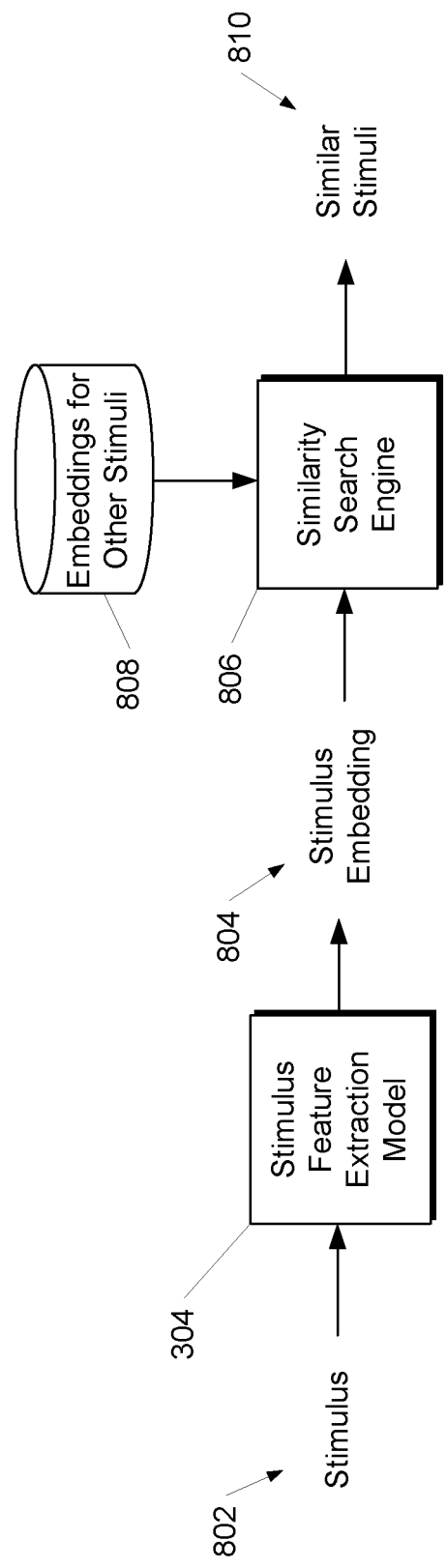
FIG. 7 depicts a block diagram of an example scheme to perform similarity search according to example embodiments of the present disclosure.

FIG. 7 depicts a block diagram of an example scheme to perform similarity search according to example embodiments of the present disclosure. In particular, as shown in FIG. 7, a new stimulus 802 can be provided to the stimulus feature extraction model 304, which can, in response, produce a stimulus embedding 804. A similarity search engine 806 can obtain the stimulus embedding 804 and can compare the stimulus embedding 804 to a plurality of embeddings for other stimuli 808 to identify one or more similar stimuli 810. For example, a measure of distance (e.g., L2 norm) can be generated within the embedding dimensional space to identify the similar stimuli 810 (e.g., the stimuli for which the measure of distance is smallest).

FIG. 8 depicts a block diagram of an example scheme to train a classification or detection model according to example embodiments of the present disclosure. In particular, FIG. 8 illustrates the addition of a decoder model 906 subsequent to a biometric feature extraction model 310. The decoder model 906 can be any type of machine-learned model including, for example, an artificial neural network, a linear model, a regression model, etc. The decoder model 906 can include one or more layers.

The biometric feature extraction model 310 can output a biometric embedding 904 based on a biometric data 902. A ground truth label 903 can be associated with the biometric data 902. In some implementations, the ground truth label 903 can be a manually applied label.

The decoder model 906 can be trained to make a predicted classification or detection 908 based on the biometric embedding 904 output by the biometric feature extraction model 310. The predicted classification or detection 908 can be any type of classification or detection, such as classifications or detections resultant from any of the perceptual tasks described with reference to FIG. 1, including attention outputs.

A loss function 910 can compare (e.g., determine a difference between) the predicted classification or detection 908 and the ground truth label 903. The decoder model 906 can be learned based on the loss function 910. For example, for each of a number of different training examples, the loss function 910 can be backpropagated through the decoder model 906 to modify the values of the parameters of the decoder model 906.

In some implementations, during learning of the decoder model 906, the parameters of the biometric feature extraction model 310 can be held fixed. In other implementations, the biometric feature extraction model 310 can be jointly learned (e.g., refined) with the decoder model 906. For example, the loss function 910 can continue to be backpropagated through the biometric feature extraction model 310 after backpropagation through the decoder model 906.

In some implementations, the biometric data 902 and predicted classification or detection 908 can be of the same data type and perceptual task as the data upon which the biometric feature extraction model 310 was previously trained (e.g., as illustrated in FIG. 2 or 3). Thus, in one example, the classification or detection model that results from the training in FIG. 8 can perform the same perceptual task that was performed by the living organism. In other implementations, the biometric data 902 and predicted classification and detection 908 can be of a different data type and/or perceptual task as the data upon which the biometric feature extraction model 310 was previously trained (e.g., as illustrated in FIG. 2 or 3). Thus, in one example, the classification or detection model that results from the training in FIG. 8 can perform a different perceptual task than was performed by the living organism. For example, the different perceptual task may be a related perceptual task. As one example, multi-model training can be performed to learn a feature extraction model based on stimulus data including general images of dogs. Additional supervised learning on a small manually labeled dataset can be performed as shown in FIG. 8 to further learn a model capable of detecting a certain breed of dog. Thus, transfer learning can be performed using the model resultant from a multi-modal learning scheme as a starting point.

FIG. 9 depicts a block diagram of an example scheme to employ a classification or detection model (e.g., after the training performed in FIG. 8). In particular, as shown in FIG. 9, a new set of biometric data 1002 can be provided to the biometric feature extraction model 310, which can, in response, produce a biometric embedding 1004. The decoder model 906 can receive the biometric embedding 1004 and generate a predicted classification or detection 1006. The predicted classification or detection 1006 can be the solution to a perception task. Alternatively or additionally to a predicted classification or detection 1006, a decoder can be trained and used to generate an approximation of a stimulus that caused the living organism to produce the biometric data.

FIG. 10 depicts a block diagram of an example scheme to generate clusters according to example embodiments of the present disclosure. In particular, as shown in FIG. 10, a new set of biometric data 1102 can be provided to the biometric feature extraction model 310, which can, in response, produce a biometric embedding 1104. A clusterer 1106 can obtain the biometric embedding 1104 and provide a cluster assignment 1108 for the biometric data 1102. In some implementations, a classification for the biometric data 1102 can be generated based on the cluster assignment 1108. For example, biometric data with known ground truth labels can be assigned to clusters and the clusters can adopt the labels of the biometric data assigned to such clusters, which can then be assigned to all cluster members.

FIG. 11 depicts a block diagram of an example scheme to perform similarity search according to example embodiments of the present disclosure. In particular, as shown in FIG. 11, a new set of biometric data 1202 can be provided to the biometric feature extraction model 310, which can, in response, produce a biometric embedding 1204. A similarity search engine 1206 can obtain the biometric embedding 1204 and can compare the biometric embedding 1204 to a plurality of embeddings for other sets of biometric data 1208 to identify one or more similar sets of biometric data 1210. For example, a measure of distance (e.g., L2 norm) can be generated within the embedding dimensional space to identify the similar sets of biometric data 1210 (e.g., the sets of data for which the measure of distance is smallest).

Each of the clusterer 706, similarity search engine 806, clusterer 1106, and similarity search engine 1206 can include computer logic utilized to provide desired functionality. Each of the clusterer 706, similarity search engine 806, clusterer 1106, and similarity search engine 1206 can be implemented in hardware, firmware, and/or software controlling a general purpose processor. For example, in some implementations, each of the clusterer 706, similarity search engine 806, clusterer 1106, and similarity search engine 1206 includes program files stored on a storage device, loaded into a memory and executed by one or more processors. In other implementations, each of the clusterer 706, similarity search engine 806, clusterer 1106, and similarity search engine 1206 includes one or more sets of computer-executable instructions that are stored in a tangible computer-readable storage medium such as RAM hard disk or optical or magnetic media.

Example Devices and Systems

Figure 12A:
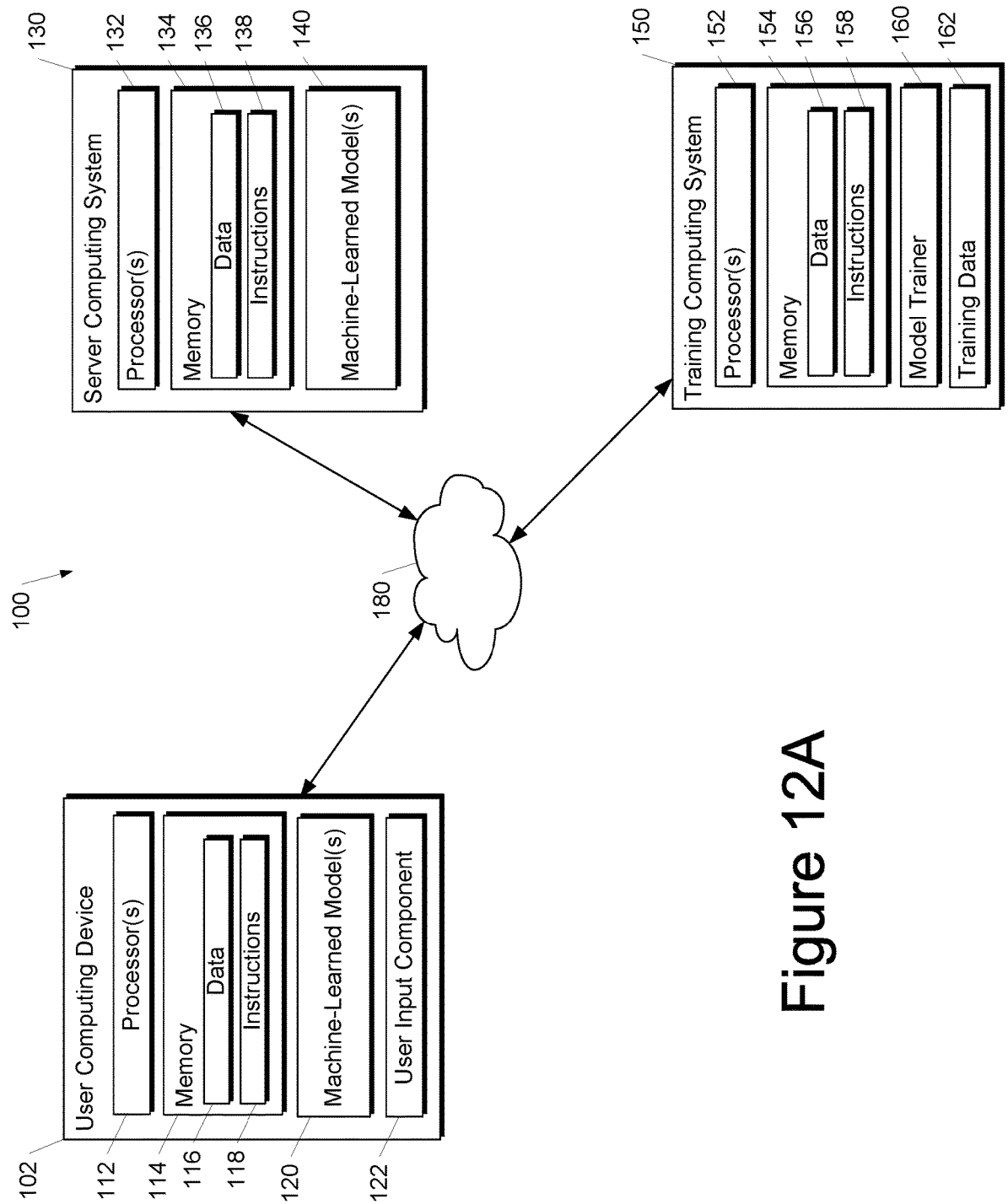
FIG. 12A depicts a block diagram of an example computing system according to example embodiments of the present disclosure.

FIG. 12A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as artificial neural networks (e.g., deep artificial neural networks) or other types of machine-learned models, including non-linear models and/or linear models. Artificial neural networks can include feed-forward artificial neural networks, recurrent artificial neural networks (e.g., long short-term memory recurrent artificial neural networks), convolutional artificial neural networks or other forms of artificial neural networks. Example machine-learned models 120 are discussed with reference to FIGS. 2-11.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include artificial neural networks or other multi-layer non-linear models. Example artificial neural networks include feed forward artificial neural networks, deep artificial neural networks, recurrent artificial neural networks, and convolutional artificial neural networks. Example models 140 are discussed with reference to FIGS. 2-11.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, training data generated as illustrated in FIG. 1 and/or additional supervised training data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 12A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 12B:
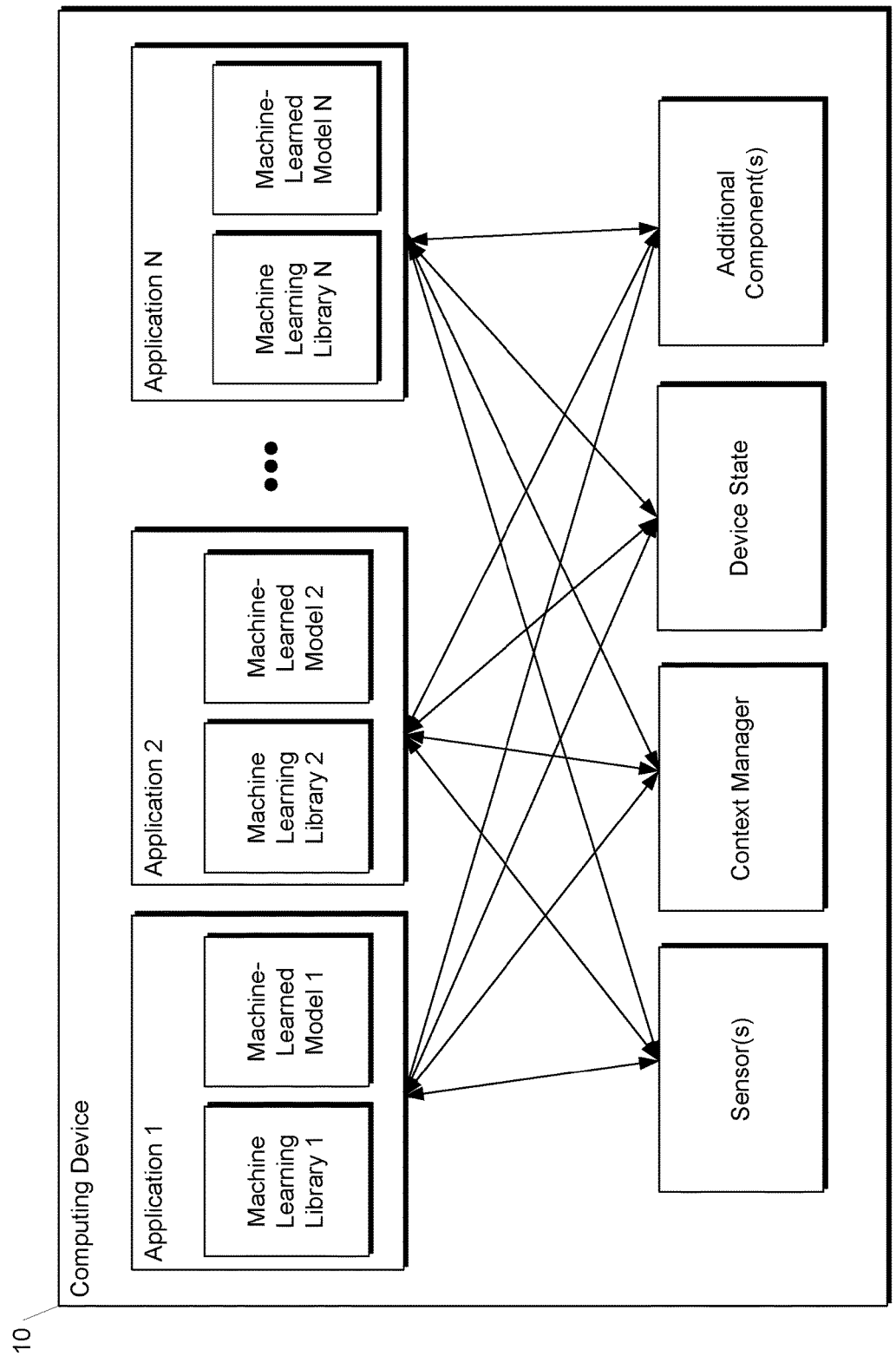
FIG. 12B depicts a block diagram of an example computing device according to example embodiments of the present disclosure.

FIG. 12B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 12B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 12C:
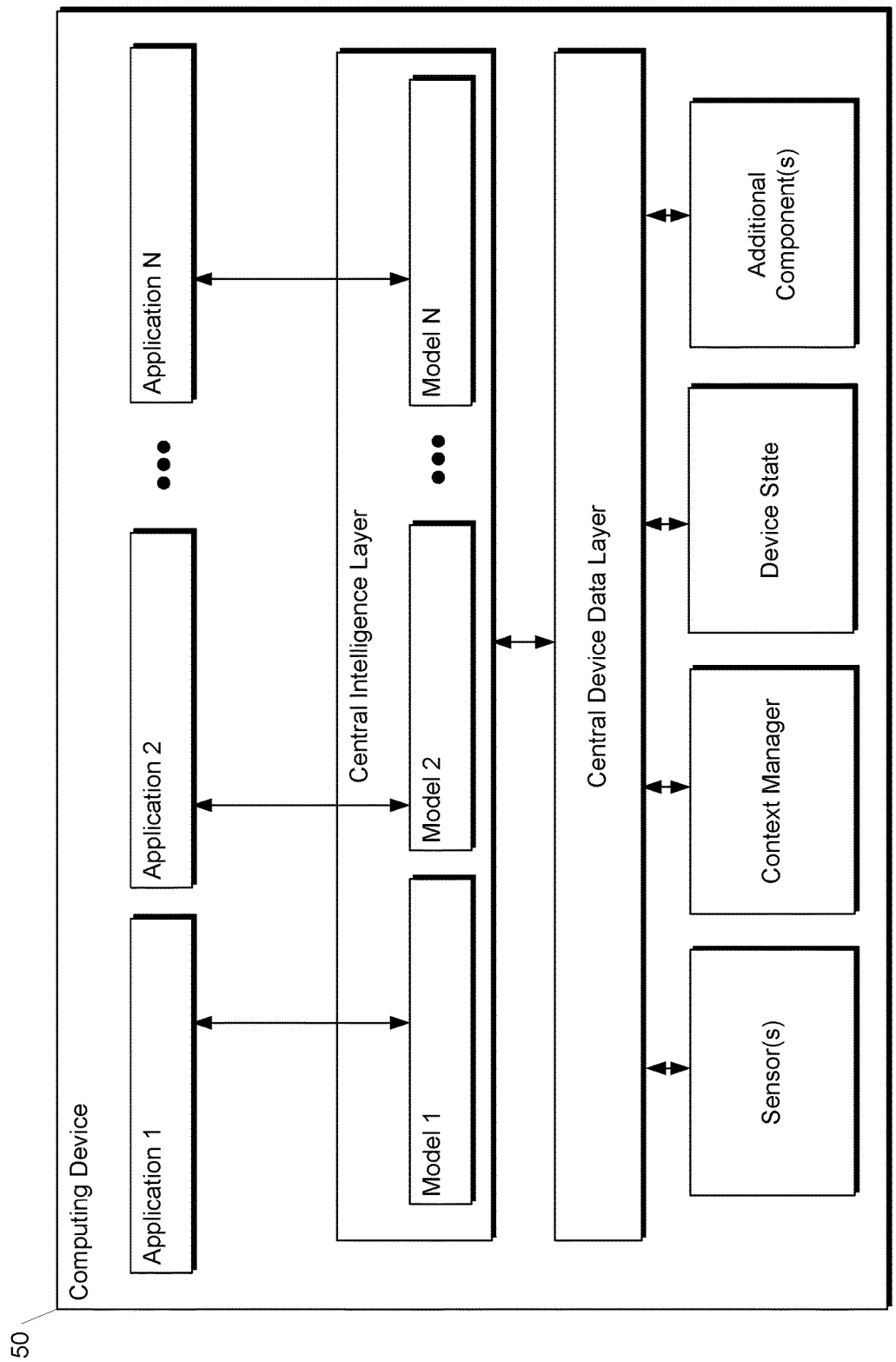
FIG. 12C depicts a block diagram of an example computing device according to example embodiments of the present disclosure.

FIG. 12C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 12C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 12C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 13:
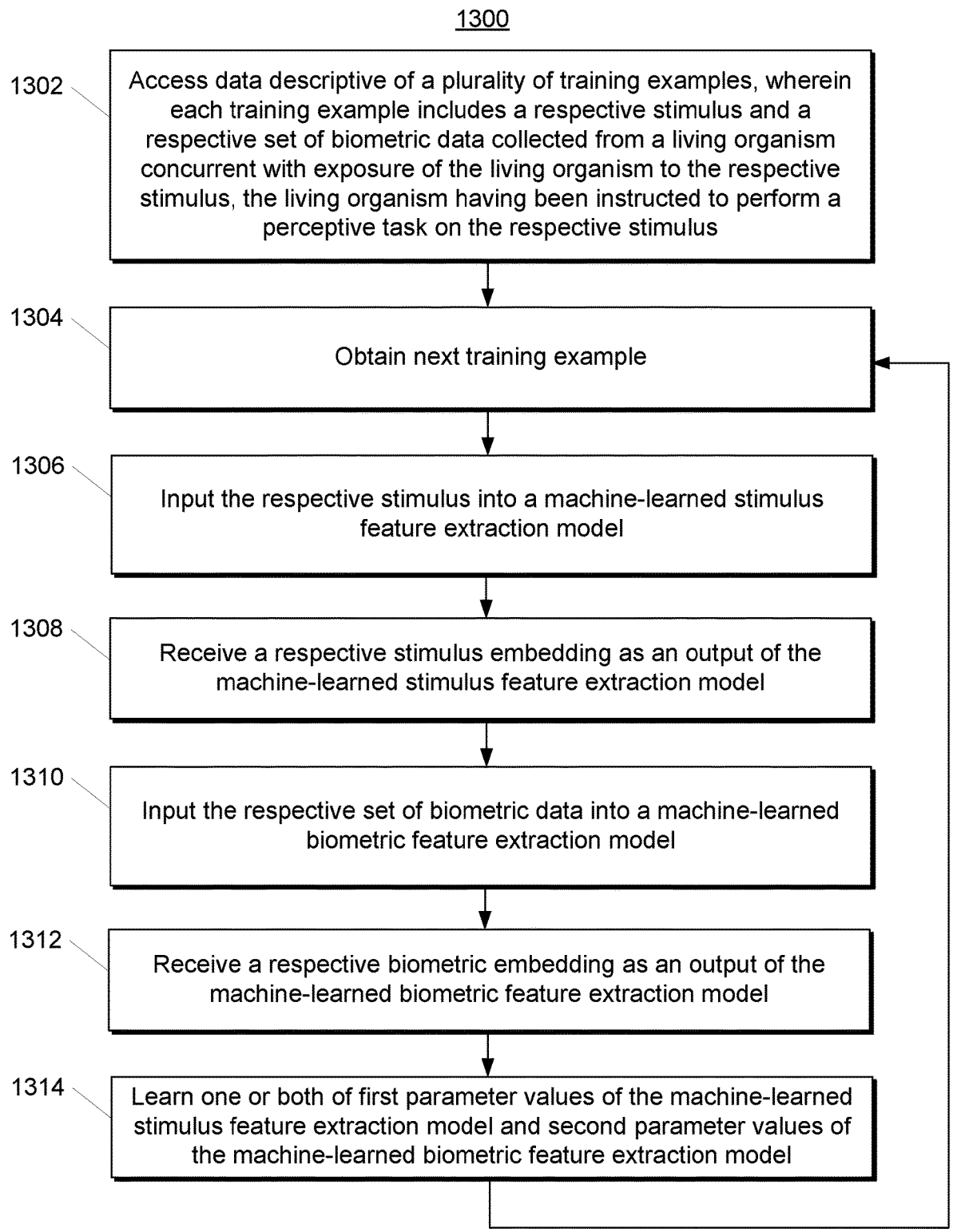
FIG. 13 depicts a flow diagram of an example method to perform multi-modal learning according to example embodiments of the present disclosure.

FIG. 13 depicts a flow chart diagram of an example method 1300 to perform multi-modal learning according to example embodiments of the present disclosure. Although FIG. 13 depicts steps performed in a particular order for purposes of illustration and discussion, the methods of the present disclosure are not limited to the particularly illustrated order or arrangement. The various steps of the method 1300 can be omitted, rearranged, combined, and/or adapted in various ways without deviating from the scope of the present disclosure.

At 1302, a computing system can access data descriptive of a plurality of training examples. Each training example can include a respective stimulus and a respective set of biometric data collected from a living organism concurrent with exposure of the living organism to the respective stimulus. The living organism can have been instructed to perform a perceptive task on the respective stimulus.

At 1304, the computing system can obtain the training example. For example, portions of method 1300 can be performed iteratively over a number of different training examples. At the first instance of 1304, a first training example can be obtained.

At 1306, the computing system can input the respective stimulus into a machine-learned stimulus feature extraction model. At 1308, the computing system can receive a respective stimulus embedding as an output of the machine-learned stimulus feature extraction model.

At 1310, the computing system can input the respective set of biometric data into a machine-learned biometric feature extraction model. At 1312, the computing system can receive a respective biometric embedding as an output of the machine-learned biometric feature extraction model.

In some implementations, the method 1300 can include normalizing the respective set of biometric data to form a normalized set of biometric data. In some of such implementations, performing the inputting at 1310 can include inputting the normalized set of biometric data into the machine-learned biometric feature extraction model.

At 1314, the computing system can learn, based on the respective stimulus embedding and the respective biometric embedding, one or both of first parameter values of the machine-learned stimulus feature extraction model and second parameter values of the machine-learned biometric feature extraction model.

In some implementations, performing the learning at 1314 can include determining a correlation between the respective stimulus embedding and the respective biometric embedding and adjusting one or both of the first parameter values of the machine-learned stimulus feature extraction model and the second parameter values of the machine-learned biometric feature extraction model based at least in part on a gradient of an objective function that seeks to maximize the correlation between the respective stimulus embedding and the respective biometric embedding.

In some implementations, performing the learning at 1314 can include providing the respective stimulus embedding and the respective biometric embedding to a machine-learned fusion model configured to process the respective stimulus embedding and the respective biometric embedding to produce a prediction that indicates whether the respective stimulus and the respective set of biometric data are associated with each other. In some implementations, performing the learning at 1314 can include adjusting one or both of the first parameter values of the machine-learned stimulus feature extraction model and the second parameter values of the machine-learned biometric feature extraction model based at least in part on a gradient of a loss function that compares the prediction produced by the machine-learned fusion model to a ground truth label that indicates whether the respective stimulus and the respective set of biometric data are associated with each other.

After 1314, the computing system can return to 1304 and obtain the next training example. For example, additional iterations can be performed until one or more stopping criteria are met. The stopping criteria can be any number of different criteria including, as examples, a loop counter reaching a predefined maximum, an iteration over iteration change in parameter adjustments falling below a threshold, a gradient of the objective function being below a threshold value, and/or various other criteria.

In some implementations, after learning the first parameter values of the machine-learned stimulus feature extraction model, the method 1300 can further include: inputting an additional stimulus into the machine-learned stimulus feature extraction model and receiving an additional stimulus embedding as an output of the machine-learned stimulus feature extraction model. In some of such implementations, the method 1300 can further include one or more of: performing the perceptual task on the additional stimulus based on the additional stimulus embedding; performing a second, different perceptual task on the additional stimulus based on the additional stimulus embedding; clustering the additional stimulus with one or more other stimuli based on the additional stimulus embedding; and identifying one or more other stimuli that are similar to the additional stimulus based on the additional stimulus embedding.

In some implementations, after learning the second parameter values of the machine-learned biometric feature extraction model, the method 1300 can further include: inputting an additional set of biometric data into the machine-learned biometric feature extraction model and receiving an additional biometric embedding as an output of the machine-learned biometric feature extraction model. In some of such implementations, the method 1300 can further include one or more of: decoding the additional biometric embedding to obtain an outcome of the perceptual task; clustering the additional set of biometric data with one or more other sets of biometric data based on the additional biometric embedding; and identifying one or more other sets of biometric data that are similar to the additional set of biometric data based on the additional biometric embedding.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to perform multi-modal learning, the method comprising:
    accessing, by one or more computing devices, data descriptive of a plurality of training examples, wherein each training example comprises a respective stimulus and a respective set of biometric data collected from a living organism concurrent with exposure of the living organism to the respective stimulus, the living organism having been instructed to perform a perceptual task on the respective stimulus during exposure of the living organism to the respective stimulus; and
    for each of one or more of the plurality of training examples:
        inputting, by the one or more computing devices, the respective stimulus into a machine-learned stimulus feature extraction model configured to process the respective stimulus to produce a respective stimulus embedding;
        receiving, by the one or more computing devices, the respective stimulus embedding as an output of the machine-learned stimulus feature extraction model;
        inputting, by the one or more computing devices, the respective set of biometric data into a machine-learned biometric feature extraction model configured to process the respective set of biometric data to produce a respective biometric embedding;
        receiving, by the one or more computing devices, the respective biometric embedding as an output of the machine-learned biometric feature extraction model; and
        learning, by the one or more computing devices and based at least in part on the respective stimulus embedding and the respective biometric embedding, one or both of: first parameter values of the machine-learned stimulus feature extraction model and second parameter values of the machine-learned biometric feature extraction model.

2. The computer-implemented method of claim 1, wherein, for each of the plurality of training examples, the respective set of biometric data comprises a respective set of neural recording data descriptive of neural activity of the living organism concurrent with exposure of the living organism to the respective stimulus.

3. The computer-implemented method of claim 2, wherein, for each of the plurality of training examples, the respective set of neural recording data comprises one or more of:
    electroencephalogram data;
    electrocorticography data;
    magnetoencephalography data; and
    functional near-infrared spectroscopy.

4. The computer-implemented method of claim 1, wherein, for each of the plurality of training examples, the respective stimulus comprises one or more of:
    a visual stimulus;
    an auditory stimulus;
    a haptic stimulus;
    an olfactory stimulus; and
    a gustatory stimulus.

5. The computer-implemented method of claim 1, wherein the perceptual task comprises classification of the respective stimulus into one or more of a plurality of classes.

6. The computer-implemented method of claim 5, wherein:
    the respective stimulus comprises an image that depicts an object; and
    the perceptual task comprises classification of the object into one or more of a plurality of object classes.

7. The computer-implemented method of claim 5, wherein:
    the respective stimulus comprises audio of human speech;
    the plurality of classes comprise one or more of: a plurality of phonemes, a plurality of words, a plurality of semantic concepts, and a plurality of emotions; and
    the perceptual task comprises classification of the human speech into one or more of the plurality of classes.

8. The computer-implemented method of claim 1, wherein the perceptual task comprises detection of one or more items contained within the respective stimulus.

9. The computer-implemented method of claim 1, wherein learning, by the one or more computing devices and based at least in part on the respective stimulus embedding and the respective biometric embedding, one or both of: the first parameter values of the machine-learned stimulus feature extraction model and the second parameter values of the machine-learned biometric feature extraction model comprises:
    determining, by the one or more computing devices, a correlation between the respective stimulus embedding and the respective biometric embedding; and
    adjusting, by the one or more computing devices, one or both of: the first parameter values of the machine-learned stimulus feature extraction model and the second parameter values of the machine-learned biometric feature extraction model based at least in part on a gradient of an objective function that seeks to maximize the correlation between the respective stimulus embedding and the respective biometric embedding.

10. The computer-implemented method of claim 1, wherein learning, by the one or more computing devices and based at least in part on the respective stimulus embedding and the respective biometric embedding, one or both of: the first parameter values of the machine-learned stimulus feature extraction model and the second parameter values of the machine-learned biometric feature extraction model comprises:

providing, by the one or more computing devices, the respective stimulus embedding and the respective biometric embedding to a machine-learned fusion model configured to process the respective stimulus embedding and the respective biometric embedding to produce a prediction that indicates whether the respective stimulus and the respective set of biometric data are associated with each other; and adjusting, by the one or more computing devices, one or both of: the first parameter values of the machine-learned stimulus feature extraction model and the second parameter values of the machine-learned biometric feature extraction model based at least in part on a gradient of a loss function that compares the prediction produced by the machine-learned fusion model to a ground truth label that indicates whether the respective stimulus and the respective set of biometric data are associated with each other.

11. The computer-implemented method of claim 1, further comprising, after learning, by the one or more computing devices, the first parameter values of the machine-learned stimulus feature extraction model:

inputting, by the one or more computing devices, an additional stimulus into the machine-learned stimulus feature extraction model;

receiving, by the one or more computing devices, an additional stimulus embedding as an output of the machine-learned stimulus feature extraction model; and one or more of:

performing, by the one or more computing device, the perceptual task on the additional stimulus based on the additional stimulus embedding;

performing, by the one or more computing device, a second, different perceptual task on the additional stimulus based on the additional stimulus embedding;

clustering, by the one or more computing devices, the additional stimulus with one or more other stimuli based on the additional stimulus embedding; and identifying, by the one or more computing devices, one or more other stimuli that are similar to the additional stimulus based on the additional stimulus embedding.

12. The computer-implemented method of claim 1, further comprising, after learning, by the one or more computing devices, the second parameter values of the machine-learned biometric feature extraction model:

inputting, by the one or more computing devices, an additional set of biometric data into the machine-learned biometric feature extraction model;

receiving, by the one or more computing devices, an additional biometric embedding as an output of the machine-learned biometric feature extraction model; and one or more of:

decoding, by the one or more computing device, the additional biometric embedding to obtain an outcome of the perceptual task;

clustering, by the one or more computing devices, the additional set of biometric data with one or more other sets of biometric data based on the additional biometric embedding; and identifying, by the one or more computing devices, one or more other sets of biometric data that are similar to the additional set of biometric data based on the additional biometric embedding.

13. The computer-implemented method of claim 1, wherein the living organism comprises a single living organism.

14. The computer-implemented method of claim 1, wherein the living organism comprises a plurality of different living organisms.

15. The computer-implemented method of claim 1, wherein the living organism comprises a human being.

16. The computer-implemented method of claim 1, wherein one or both of the machine-learned stimulus feature extraction model and the machine-learned biometric feature extraction model comprise an artificial neural network.

17. The computer-implemented method of claim 1, wherein inputting, by the one or more computing devices, the respective set of biometric data into the machine-learned biometric feature extraction model comprises:

normalizing, by the one or more computing devices, the respective set of biometric data to form a normalized set of biometric data; and inputting, by the one or more computing devices, the normalized set of biometric data into the machine-learned biometric feature extraction model.

18. A computing system comprising one or more processors and one or more non-transitory computer-readable media that collectively store instructions that, when executed by the one or more processors, cause the computing system to perform operations, the operations comprising:

accessing data descriptive of a plurality of training examples, wherein each training example comprises a respective stimulus and a respective set of biometric data collected from a living organism concurrent with exposure of the living organism to the respective stimulus, the living organism having been instructed to perform a perceptual task on the respective stimulus during exposure of the living organism to the respective stimulus; and for each of one or more of the plurality of training examples:

inputting the respective stimulus into a machine-learned stimulus feature extraction model configured to process the respective stimulus to produce a respective stimulus embedding;

receiving the respective stimulus embedding as an output of the machine-learned stimulus feature extraction model;

inputting the respective set of biometric data into a machine-learned biometric feature extraction model configured to process the respective set of biometric data to produce a respective biometric embedding;

receiving the respective biometric embedding as an output of the machine-learned biometric feature extraction model; and learning, based at least in part on the respective stimulus embedding and the respective biometric embedding, one or both of: first parameter values of the machine-learned stimulus feature extraction model and second parameter values of the machine-learned biometric feature extraction model.

19. A method for generating training data, the method comprising:

obtaining one or more training examples, wherein each training example comprises a respective stimulus; and for each of the one or more training examples:

instructing a living organism to perform a perceptual task on the respective stimulus during exposure of the living organism to the respective stimulus;

exposing the living organism to the respective stimulus;

collecting a respective set of biometric data from the living organism concurrent with exposure of the living organism to the respective stimulus;

inputting, by one or more computing devices, the respective stimulus into a machine-learned stimulus feature extraction model configured to process the respective stimulus to produce a respective stimulus embedding;

receiving, by the one or more computing devices, the respective stimulus embedding as an output of the machine-learned stimulus feature extraction model;

inputting, by the one or more computing devices, the respective set of biometric data into a machine-learned biometric feature extraction model configured to process the respective set of biometric data to produce a respective biometric embedding;

receiving, by the one or more computing devices, the respective biometric embedding as an output of the machine-learned biometric feature extraction model; and learning, by the one or more computing devices and based at least in part on the respective stimulus embedding and the respective biometric embedding, one or both of: first parameter values of the machine-learned stimulus feature extraction model and second parameter values of the machine-learned biometric feature extraction model.

* * * * *